Nov. 29, 1932. E. H. BENN 1,889,533
TOP FOR RUMBLE SEATS OF AUTOMOBILES
Original Filed Nov. 15, 1929  2 Sheets-Sheet 2
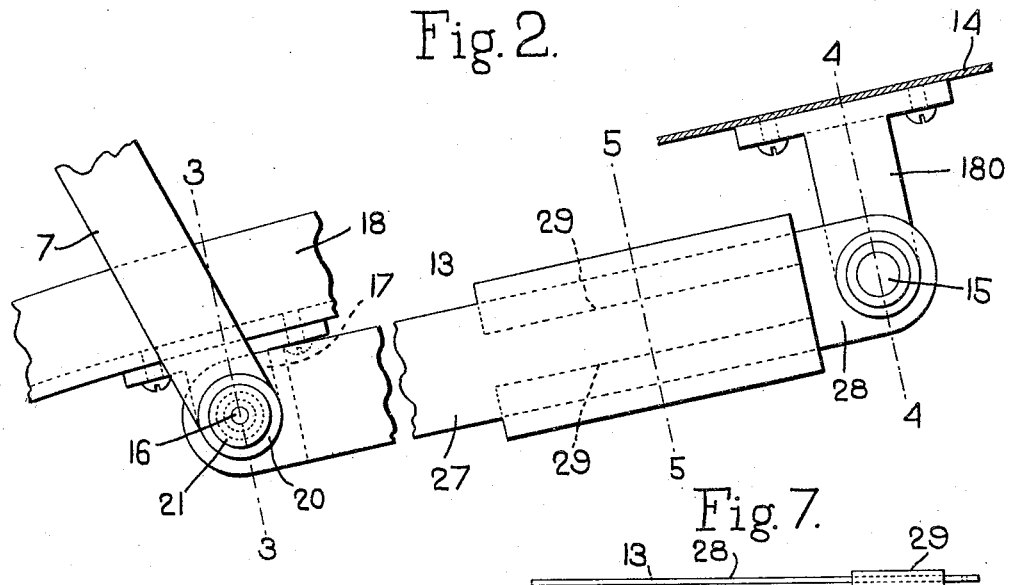
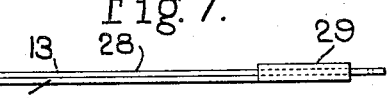
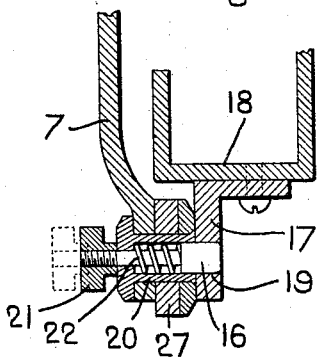
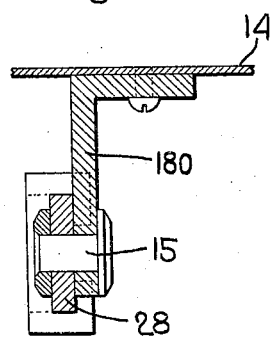
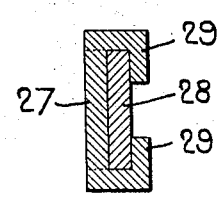
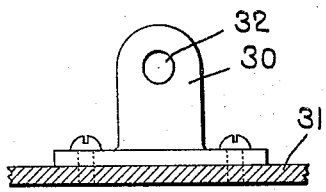
Inventor.
Edward H. Benn
by Heard Smith & Tennant.
Attys.

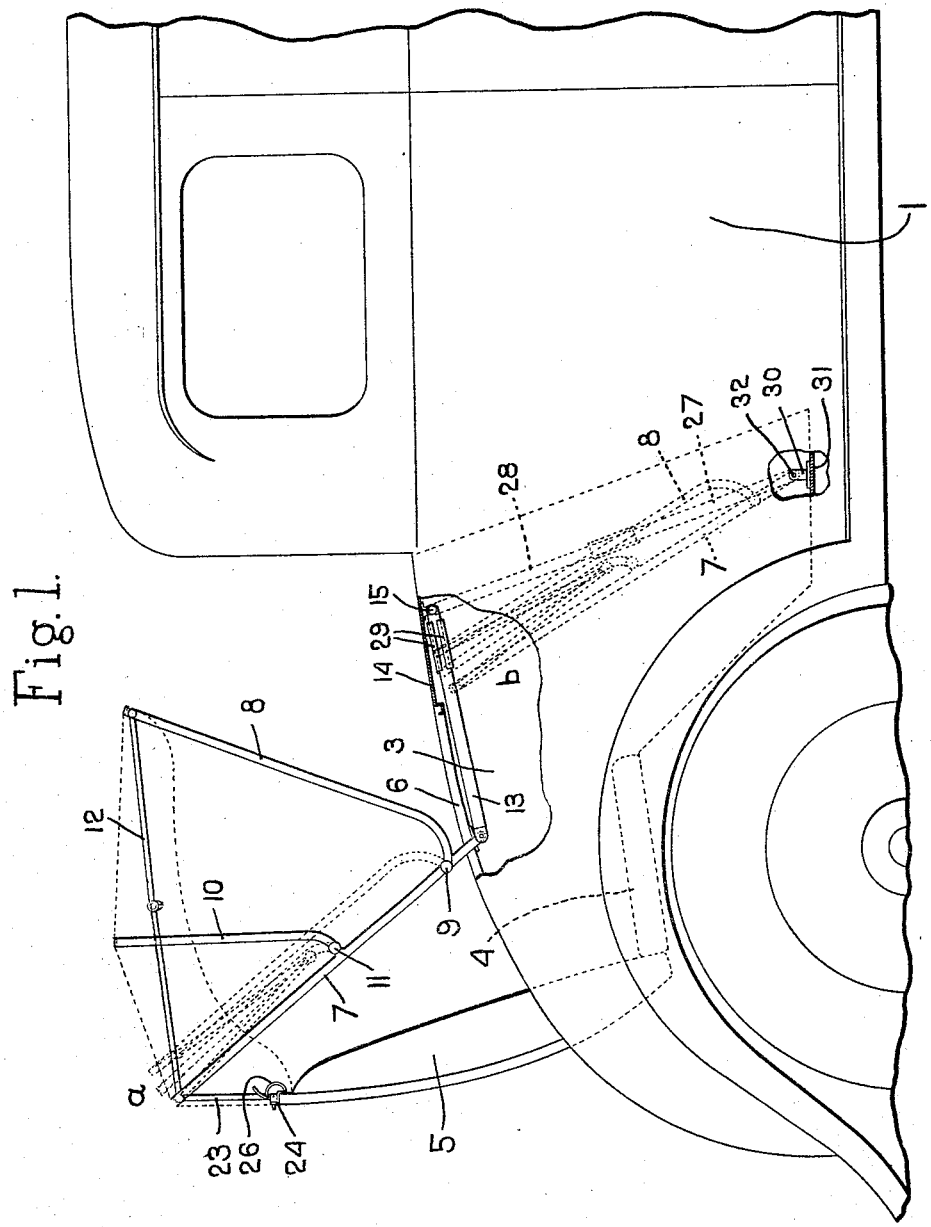

Patented Nov. 29, 1932

1,889,533

UNITED STATES PATENT OFFICE

EDWARD H. BENN, OF BOSTON, MASSACHUSETTS, ASSIGNOR TO RUMBLETOP CORPORATION, OF BOSTON, MASSACHUSETTS, A CORPORATION OF MASSACHUSETTS

TOP FOR RUMBLE SEATS OF AUTOMOBILES

Application filed November 15, 1929, Serial No. 407,503. Renewed April 22, 1932.

This invention relates to a top for a rumble seat of an automobile and especially to folding tops which are constructed to be stored in the rear compartment of the automobile.

The general object of the invention is to provide an improved means for mounting and supporting the top by which it can be quickly and easily folded and stored in the compartment and as quickly and easily withdrawn from the compartment and opened out for use.

A further object of the invention is to provide a novel manner of mounting a rumble seat top which does not involve the use of any fixed guiding members at the sides of the rear compartment of the automobile.

Further objects of the invention are to improve generally rumble seat tops all as will be more fully hereinafter set forth.

In the drawings, Fig. 1 is a fragmentary side view of an automobile with parts broken out showing a rumble seat top embodying my invention;

Fig. 2 is an enlarged fragmentary view illustrating the supporting means for the top;

Fig. 3 is a section on the line 3—3, Fig. 2;
Fig. 4 is a section on the line 4—4, Fig. 2;
Fig. 5 is a section on the line 5—5, Fig. 2;
Fig. 6 is a view of the anchoring device in the floor of the compartment and to which the folded top may be secured;

Fig. 7 is a top plan view of one of the swinging supports.

In the drawings, 1 indicates an automobile of the type which is equipped with a rear compartment 3 and a rumble seat 4 in said compartment. 5 indicates the back of the rumble seat, said back being adapted to be folded down into a position to close the opening 6 leading to the compartment 3 as usual in automobiles equipped with a rumble seat.

My improved top for the rumble seat comprises a folding top frame which supports the top material. The folding frame herein illustrated includes the rear bow 7, the front bow 8 pivoted to the rear bow at 9 and the intermediate bow 10 also pivoted to the rear bow at 11. The intermediate and front bows are adapted to fold toward the rear bow in folding the top and said bows are held in their opened position by means of a suitable toggle lever brace 12.

The top is carried by swinging supports 13 which are shown as pivoted to the under side of the rear deck 14 of the car at 15, and means are provided for locking the supports in their raised position shown in full lines Fig. 1 when the top is opened out or spread. I will preferably use two such supports, one at each side of the opening 6.

When the top is to be stored in the compartment 3, it is first folded as shown by dotted lines $a$ in Fig. 1 and then the swinging supports 13 are unlocked and the folded top and supports swung downwardly into the compartment into the dotted line position $b$ Fig. 1.

The means herein shown for locking or holding the swinging supports 13 in their elevated position shown in full lines Fig. 1 when the top is spread comprises a spring-pressed locking pin 16 carried by the lower end of each arm of the bow 7 and which is adapted to be interlocked with a supporting bracket 17 secured to the under side of the channel frame 18 that surrounds the opening 6 leading to the compartment 3.

This bracket 17 is provided with an opening 19 to receive the locking pin 16 and the latter is shown as operating in a bushing 20 carried by the bow 7 and as provided with a head 21 by which it may be manipulated. This locking pin is backed by a spring 22 which normally projects it beyond the bushing 20.

It will be understood that there are two of these supporting members 13, one on each side of the automobile, said members being connected to the ends of the two arms of the bow 7. When the two locking pins 16 are engaged with the brackets 17 the supporting members 13 will be held in their raised position and the top will also be held in its elevated position.

The top is held steady when it is spread by means of two strut members 23 which are pivotally connected to the bow 7 and are detachably clamped to the upper edge 24 of the seat back 5 by means of any suitable clamping device, illustrated in a general way at 26.

When the top is spread or opened as shown in Fig. 1 it is held rigidly in position by reason of the fact that the rear bow 7 is rigidly held at both the top end and the bottom and by reason of the further fact that the front bow 8 is rigidly held in expanded position by the toggle braces 12.

I have stated above how the top can be folded and stored in the compartment 3 by first breaking down the toggle braces 12 and folding the top as shown by the dotted line position a Fig. 1 and then unlocking the lower ends of the bow 7 from the supporting brackets 17 by withdrawing the locking pins 16 as shown by dotted line position Fig. 3. After this is done the supporting members 13 may be swung downwardly about their pivots 15 thus carrying the folded top into the compartment 3.

In order to hold the folded top firmly in its folded or collapsed position I propose to make the supporting members 13 telescopic or extensible so that when the top is carried into the compartment 3 said members 13 can be extended and the lower ends thereof fastened to the floor 31 of the compartment. For this purpose each supporting member 13 is shown as comprising two telescopic members 27, 28. Each member 27 is pivoted to the lower end of the bow 7 and each member 28 is pivoted to the bracket 180 as shown at 15.

The members 27 are provided at their forward ends with ears or lips 29 which partially embrace the member 28 and thus hold the members in parallelism during the expanding or contracting movement. When the top is folded and is placed in the compartment 3 the supporting members 13 will be extended as shown in dotted lines Fig. 1 so as to bring the ends of the members 27 that are connected to the bow 7 adjacent the floor 31 of the compartment.

I have herein shown said floor as provided with two anchoring brackets 30 each provided with a hole 32 adapted to receive the locking pin 16. When the top has been placed in the compartment 3 the lower ends of the bows may be locked to the bracket 30 by means of the anchoring pins 16 thereby firmly holding the lower end of the top. The upper end of the folded top may be held in its position by means of suitable straps or other fastening devices.

I claim:

1. The combination with an automobile body having a main top for the driver's seat, a rear deck back of the main top, a rear compartment beneath said deck, an opening in the rear deck leading to said compartment and a rumble seat within said compartment, of two supporting members pivoted at their front ends to the automobile body at the upper part of said compartment and in front of said opening and swingable from a raised operative position in which they extend substantially horizontally beneath said deck to an inoperative substantially vertical position in front of the rumble seat, a folding top separate and independent from the main top and pivotally connected to the rear ends of said supporting members, said top when extended and held in raised position by the raised supporting members operating to shelter the rumble seat and when folded being movable bodily through said opening into the compartment in a position in front of the rumble seat by the swinging movement of the supporting members from their operative to their inoperative position.

2. The combination with an automobile body having a main top for the driver's seat, a rear deck back of said top, a rear compartment beneath the deck, a rumble seat in said compartment and an opening in the deck leading to the compartment and giving access to the rumble seat, of two supporting members pivoted at their front ends to the under side of the deck in front of said opening, a folding rumble seat top comprising a main supporting bow pivoted to the rear ends of said supporting members, and other bows pivoted to the main supporting bow to fold thereagainst, the supporting members being swingable about their pivots from a raised position in which they are located entirely within the compartment but closely adjacent the under side of the deck to a lowered position in which they extend substantially vertically in front of the rumble seat, the rumble seat top when extended being held by the raised supporting members in position to shelter the rumble seat, and said top when folded movable bodily through said opening as the supporting members swing into inoperative position and into a position within said compartment in front of the rumble seat.

3. The combination with an automobile body having a main top for the driver's seat, a rear deck back of the main top, a rear compartment beneath said deck, an opening in the rear deck leading to said compartment and a rumble seat within said compartment, of two supporting members pivoted at their front ends to the automobile body at the upper part of said compartment and in front of said opening and swingable from a raised operative position in which they extend substantially horizontally beneath said deck to an inoperative substantially vertical position in front of the rumble seat, a folding top separate and independent from the main top and pivotally connected to the rear ends of said supporting members, said top when extended and held in raised position by the raised supporting members operating to shelter the rumble seat and when folded being movable bodily through said opening into the compartment in a position in front of the rumble seat by the swinging movement of the supporting members from their operative to their inoperative position, and releasable means to lock the supporting members in their raised position.

4. The combination with an automobile body having a main top for the driver's seat, a rear deck back of said top, a rear compartment beneath the deck, a rumble seat in said compartment and an opening in the deck leading to the compartment and giving access to the rumble seat, of two supporting members pivoted at their front ends to the under side of the deck in front of said opening, a folding rumble seat top comprising a main supporting bow pivoted to the rear ends of said supporting members, and other bows pivoted to the main supporting bow to fold thereagainst, the supporting members being swingable about their pivots from a raised position in which they are located entirely within the compartment but closely adjacent the under side of the deck to a lowered position in which they extend substantially vertically in front of the rumble seat, the rumble seat top when extended being held by the raised supporting members in position to shelter the rumble seat, and said top when folded movable bodily through said opening as the supporting members swing into inoperative position and into a position within said compartment in front of the rumble seat, and releasable means to lock the supporting members in their raised position.

5. A structure such as claimed in claim 1 in which the supporting members are longitudinally extensible so that as they swing into inoperative position they may be extended to permit the folding top to be stored underneath the deck in a folded but substantially upright position.

In testimony whereof, I have signed my name to this specification.

EDWARD H. BENN.